(12) United States Patent
Marini et al.

(10) Patent No.: US 6,202,309 B1
(45) Date of Patent: Mar. 20, 2001

(54) CAKE REMOVAL UTENSIL

(76) Inventors: David Robert Marini; Anthony Nicholas Marini, both of 3460 Union St., Wheat Ridge, CO (US) 80033

( * ) Notice: Subject to any disclaimer, the term of this patent is extended or adjusted under 35 U.S.C. 154(b) by 0 days.

(21) Appl. No.: 09/247,959

(22) Filed: Feb. 10, 1999

(51) Int. Cl.$^7$ ........................................... A47L 17/06
(52) U.S. Cl. ........................ 30/169; 30/340; 15/236.07
(58) Field of Search ........................... 30/169, 340, 356; 15/236.01, 236.05, 236.07

(56) References Cited

U.S. PATENT DOCUMENTS

| | | | |
|---|---|---|---|
| 522,794 | * 7/1894 | Lemke | 30/169 |
| 710,955 | * 10/1902 | Crawford | 30/169 |
| 875,435 | * 12/1907 | Johnston | 30/169 |
| 4,188,412 | 2/1980 | Sejpal . | |
| 4,642,894 | * 2/1987 | Campbell | 30/169 |
| 5,033,156 | * 7/1991 | Stewart | 15/236.05 |

OTHER PUBLICATIONS

Betty Crocker's, New Cookbook, Eight Edition, Copyright 1996, Published by MacMillan, p. 11, Paraghaph 2.

* cited by examiner

*Primary Examiner*—Hwei-Slu Payer

(57) ABSTRACT

A utensil comprised of a shaped wire utilizing mechanical separation to facilitate the removal of foodstuffs from their container to eliminate the possibility of breakage.

1 Claim, 1 Drawing Sheet

CAKE REMOVAL UTENSIL

BACKGROUND OF THE INVENTION

The present invention relates to in general a utensil to facilitate the removal of a cake: and more specifically, relates to a utensil comprised of a shaped wire to facilitate the removal of cake from its baking pan to eliminate the possibility of breakage.

Removing cake layers from their pans after baking has often resulted in breakage. Breakage has resulted in additional time and expense to either replace the affected layers or try to piecemeal them together to add frosting.

Numerous methods have been devised to provide a non-stick surface for cake pans to reduce the occurrence of this consequence. Betty Crocker's "New Cookbook" eight edition copyright 1996 page 11, cites Grease and Flour as a method of preventing food from sticking during baking, such as cakes. This method requires rubbing the inside of a pan with shorting before dusting it with flour to hamper cakes from sticking. Experience has shown this method does not prevent breakage in all cases. Furthermore, addition of shorting such as all vegetable shorting can add 12 grams of fat for each tablespoon of shortening used. American Home Foods product U.S. Pat. No. 4,188,412 uses Lecithin from soybeans in an aerosol form to reduce the occurrence of sticking. This method does not prevent breakage in all cases and can become flammable if applied on heated surfaces or near an open flame. Non stick surfaces such as Teflon have been bonded to pans to reduce the occurrence of sticking. Again, even when used in conjunction with the above mentioned methods, breakage is not prevented.

BRIEF SUMMARY OF THE INVENTION

The principal object of the invention is to provide a device to mechanically and simplistically separate a prepared substance from any container. To ensure the above mention while minimizing the potential for breakage.

It is also an object of the present invention to provide a device which is simple and inexpensive construction.

Another object is to provide a device which is reliable and with ease of storage.

A further object is to provide a device which can be used on various shapes of containers pans including round and rectangular.

The foregoing objects can be accomplished by a novel and improved device which is a two-part construction. The first part comprises a geometric cross section material of given length which comprises a formed part an offset part and a straight part. The second optional part comprises a removable handle which adjoins either end of the first part to facilitate usage. The preferred embodiment is utilized when separation between the prepared substance and the container is desired. The end which correctly matches the container configuration is chosen and is inserted between the substance prepared and the container. The end opposite the inserted end is then rotated about the offset axially. After which the device is traversed about the container circumference until mechanical separation occurs between the container and the prepared substance.

BRIEF DESCRIPTION OF THE SEVERAL VIEWS OF THE DRAWING

The preferred embodiment is depicted in the following figures.

DETAILED DESCRIPTION OF THE INVENTION

Figure 1:
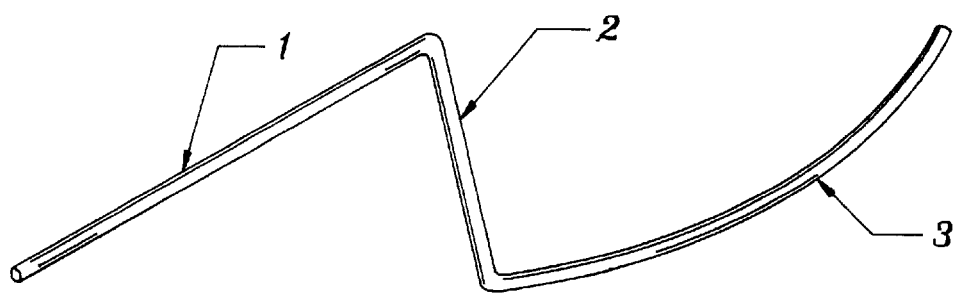
FIG. 1 is a perspective view of the utensil.
Figure 2:
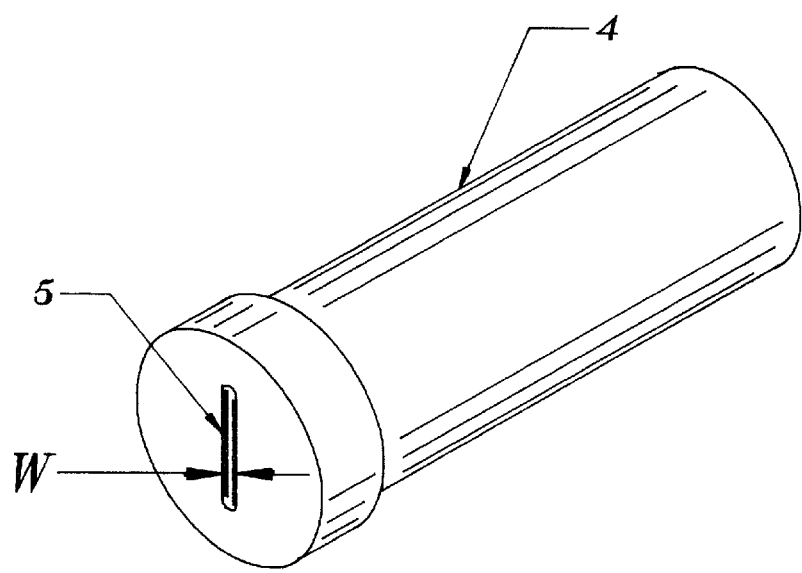
FIG. 2 is a perspective view of the handle.

Referring in detail to FIGS. 1 and 2, there is shown by way of illustrative example a preferred utensil and method for the removal of substances such as cake from a pan. The utensil comprises an elongated cylindrical structure having a straight section 1 an offset section 2 and a shaped section 3. The shaped section 3 can be curved to conform to the requirements of a round pan or it can be modified to conform to the requirements of an irregular shaped pan. Its length will equal or exceed half the width of the inside dimensions of the pan. In the case of a round pan, its length will equal the radius of the pan. The offset 2 length corresponds to the height requirements of the pan. The straight portion 1 conforms to the requirements of a rectangular pan. Its length will equal or exceed half the width of the inside dimensions of the pan. The material of construction comprises acceptable substances for use in the food industry such as stainless steel or plastic.

As a variation, a handle is provided with a grip part 4 and an opening 5. The grip section 4 is four inches in length and shaped to ergonomically fit the users hand. The opening is slotted nearly the full length of the grip part 4 to accept the straight portion 1 if required or fit the shaped portion 3 if required. The width W of the opening 5 is slightly smaller than the cross section of the straight part 1 and the shaped part 3 to provide an interference fit. The material of construction comprises plastic or wood.

Removal of the prepared substance is performed by selecting either the straight portion 1 or selecting the shaped portion 3 which corresponds to the configuration of the pan thus becoming the blade and inserting it against and parallel to the side of the pan. The portion not selected as the blade becomes the handle. Keeping the utensil against the pan side, the utensil is then pressed downward between the prepared substance and the pan consequently separating them. Once the bottom is reached, the handle is rotated axially about the offset portion 2 until separation blade is perpendicular to the perimeter of the pan. The utensil can then be traversed about the perimeter of the pan until complete separation of the prepared substance and the pan is realized.

The utensil is then rotated about the offset 2 axis until the blade is against the pan side at which time the utensil is removed. The prepared substance is then removed from the pan.

We claim:

1. A parting utensil for removing foodstuffs from their receptacles comprising:
    (a) a long narrow blade part, reversible as a handle part, shaped to conform to a receptacle which allows insertion adjacent to the walls of the receptacle for separation,
    (b) an offset part, attached perpendicularly to said blade part for which axial rotation can be accomplished,
    (c) a long narrow handle part, reversible as a blade part, attached perpendicularly to said offset part to facilitate directing said long narrow blade part and,
    (d) a detachable ergonomic handle part comprising a slotted hole providing a plurality of interference fits for said long narrow handle part or said long narrow blade part.

* * * * *